United States Patent Office 3,361,313
Patented Jan. 2, 1968

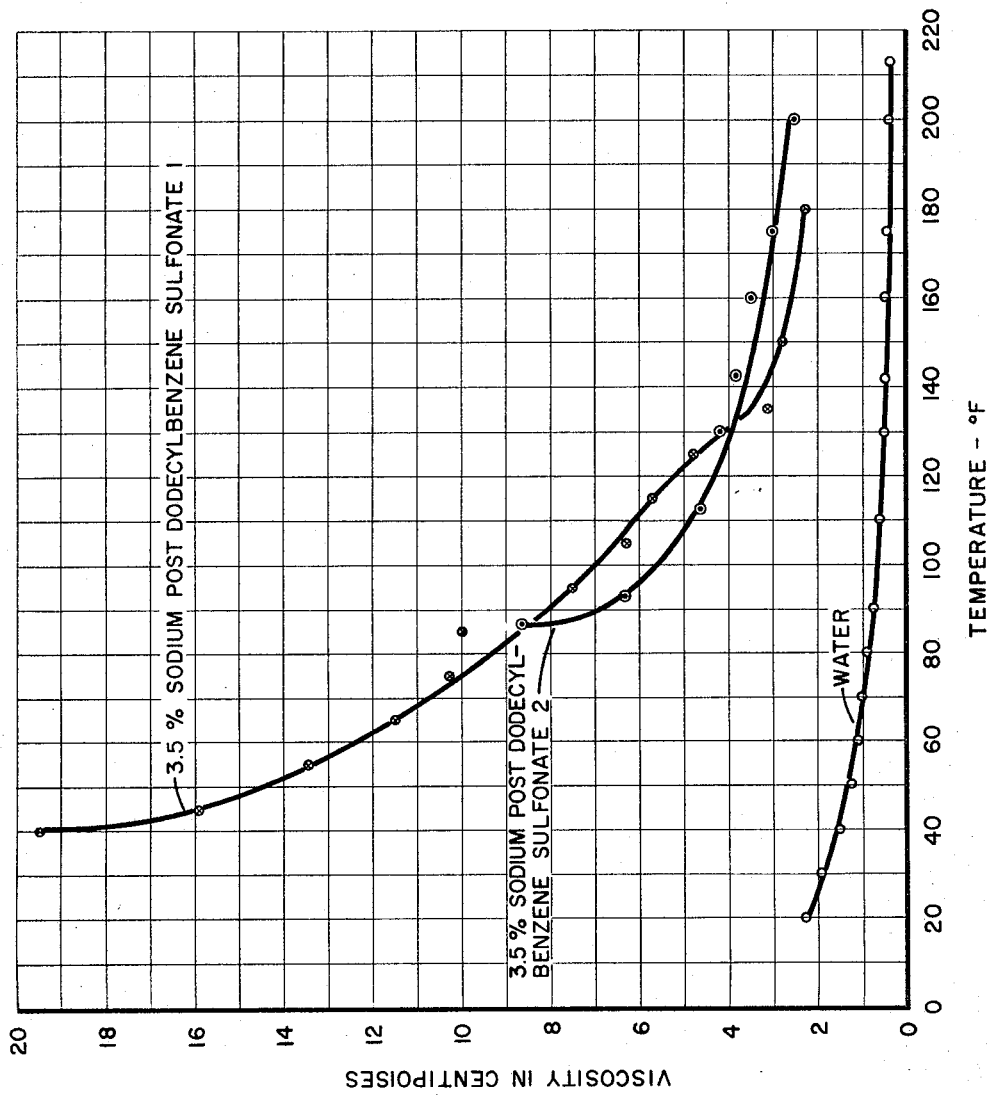

3,361,313
AGENT FOR INCREASING VISCOSITY OF
WATER-CONTAINING COMPOSITIONS
Olen L. Riggs, Jr., and John D. Sudbury, Ponca City,
Okla., assignors to Continental Oil Company, Ponca
City, Okla., a corporation of Delaware
Filed Aug. 8, 1966, Ser. No. 570,998
10 Claims. (Cl. 252—8.55)

ABSTRACT OF THE DISCLOSURE

In the field of waterflooding, it is disclosed that the viscosity of water was increased several fold by adding a minor amount, up to 5 weight percent, of an alcohol-water extract of an alkali metal alkaryl sulfonate.

---

This application is a continuation-in-part of our copending application, Ser. No. 227,544, filed Oct. 1, 1962, which in turn was a continuation-in-part of our then copending application, Ser. No. 725,788, filed Apr. 2, 1958, both now abandoned. Since filling the earlier applications, we have developed additional data which more forcefully show the advantage of this invention.

The present invention relates to a high-viscosity water composition. In one aspect the invention relates to the recovery of ol from depleted ol sands and pertains more particularly to methods of flooding subterranean sands and other oil-bearing strata with a high viscosity aqueous oil-displacing solution to obtain a secondary recovery of oil.

Oil exists in well sands or similar strata in two different states, i.e., as free oil that is located between the voids of the sand and as fixed oil which is held by absorption (and perhaps to some degree by adsorption) on the particles of the sand and which is commonly referred to as the film of oil that adheres to the particles of sand or the particles of the oleiferrous structure. Such fixed oil may be said to be held by "sorption."

Free oil can be recovered by conventional methods of oil producing, such as draining the oil in conjunction with liquid or gaseous pressure and creating an artificial fluid or gaseous pressure in the sand bed, so as to dislodge the oil from the sand bed and thereafter conduct the dislodged oil to the surface of the ground. Fixed oil, on the other hand, cannot be recovered by the conventional methods or means used to produce oil and cannot be dislodged economically by either fluid or gaseous pressure. It is very important that some means be devised for the removal of this fixed oil because, in some cases, the amount of oil remaining in the well after pumping has become unprofitable may equal 80 percent of the oil originally present. Various methods have been proposed for the recovery of this fixed oil. One method entails the process called waterflooding, which is as follows: water is introduced under pressure into a number of wells; and oil, together with water, is produced from other wells by the resultant water drive. As an aid in the waterflooding process, many agents such as surface tension reducing and capillary active agents have been proposed as addition agents to the flooding water to increase the efficiency of the waterflood. Due to various reasons and/or circumstances; however, these methods of secondary recovery have not been altogether satisfactory.

Some addition agents are objectionable for the reason that they build up deposits on the strata, thus tending to block or seal off the well's permeable strata. Accordingly, many of the oil-containing channels within the zone are permanently sealed off.

In another method, small amounts of certain wetting agents are added to the water which is used as a flooding liquid to dissolve the oil from the oil-bearing formation and to facilitate the transport of this oil to the output well. The primary shortcomings of these emulsifiers are:

(1) Excessive cost
(2) Limited miscibility with hard water, causing blocking of the formation
(3) Reaction with various inorganic ions present in the well fluid
(4) The inability of the emulsifiers to provide sufficient film strength at the oil-water interface to prevent the breakthrough of columns of water into the oil-rich zone and final channeling of water to these columns of the output well
(5) The decomposition of the addition agent during the relatively long periods required to complete the water drive, and
(6) Less sweep efficiency due to unfavorable viscosity ratio.

It has also been proposed to add certain agents to water that will increase the viscosity of the resulting aqueous solution over that of water alone, because it has been found that oil recovery may be increased by increasing the viscosity of the liquid injected to displace residual oil from depleted oil sands. Viscous liquids perform this function because, when water alone is used, there is a tendency of the waterflood to finger or to progress through the stratum ahead of the water in an adjacent stratum. In other words, the boundary between the flooding water and the driven liquid ahead of it becomes indistinct or nonuniform, whereby the advancing front of water bypasses some oil-bearing sands, thus trapping the oil therein. This fingering of the flood front may be due to fractures and large flow channels in highly permeable zones. The trapping of oil in pockets occurs particularly in oil sands which are nonuniform in texture and/or are formed in thin strata of different permeabilities. It has been proposed to overcome this objection by adding to the water materials selected from the group consisting of certain soaps, hard water soaps, alkali metal salts of alginic acid, glycerin, sucrose, water-soluble polymers, or nonaqueous solutions of various thickening materials such as hydrocarbon polymers. These materials, while they do increase the viscosity of the water, must be used in rather large quantities; and, for that reason, they are in many cases uneconomical to use and, in general, they are not satisfactory at elevated temperatures.

It is a principal object of the present invention to provide a water composition having a viscosity substantially greater than that of water. It is another object of our invention to provide an agent which when added to water increases the viscosity of the water composition. It is still another object of our invention to provide a process for preparing said aforementioned agent.

It is yet another object of the present invention to provide a process for the flooding of oil wells which obviates the disadvantages of the prior art processes. An additional object of our invention is to provide a flooding method wherein the flood front forms a substantially distinct barrier and progresses more uniformly through the oil sand so that fingering of the flooding liquid and trapping of oil are lessened; and the less uniform oil-bearing formations can be successfully waterflooded. These and additional objects and advantages of the present invention will be apparent to persons skilled in the art by reference to the following description.

Broadly described, the present invention relates to an agent for increasing the viscosity of water. In one aspect the invention relates to a water composition having a viscosity substantially greater than that of water and containing said agent. In another aspect the invention relates to a process for preparing said agent. In still another aspect the invention relates to a waterflooding process, for recovering oil from an oil-bearing formation, wherein said process uses a water composition containing said agent.

The agent referred to in the preceding paragraph can be broadly described as being an extract derived from an alkali metal alkaryl sulfonate, said sulfonate having a combining weight, as the sodium salt, of 400 or greater. The extract is prepared by first deoiling, if necessary, an alkali metal alkaryl sulfonate. This deoiled alkali metal alkaryl sulfonate is then contacted with water and alcohol. The alkaryl sulfonate can be contacted separately by alcohol and water, or an aqueous alcohol can be utilized. The extract is then recovered from the alcohol and water such as by evaporation. This extract, if separately recovered, is combined and is the water-thickening agent of this invention. It is interesting that the treatment provides a water-thickening agent which is much more effective than is the alkaryl sulfonate not so treated.

More narrowly described, the foregoing objectives are attained by introducing an aqueous oil displacing solution having a viscosity greater than that of water, which solution comprises water and an extract derived from a metal sulfonate, wherein said extract is derived by a water-alcohol extraction of sodium postdodecylbenzene sulfonate. Such a solution is introduced into a number of oil wells located in an exhausted or abandoned oil field, which permits the oil displacing solution to travel through the subterranean oil sands or oil-bearing strata and rise to the surface of the ground through a predetermined opening. The treating or oil displacing solution, employed as a flooding medium, operates to liberate the film or coating of oil on the particles of the subterranean sands and then flush the oil off said particles and carry the oil upwardly to the surface of the ground.

In describing the invention, reference will be made to the figure which is a graph plotting the viscosity of water and treated water at various temperatures.

We have discovered that by using an aqueous solution of an extract derived from an alkali metal sulfonate, which extract is obtained from the water-alcohol extraction of sodium postodecylbenzene sulfonate, will produce an aqueous solution having a viscosity substantially in excess of that of water.

The sodium postdodecylbenzene sulfonate extract abbreviated NaPDBSO$_3$ (extract) was prepared from a commercial sample of sodium postdodecylbenzene sulfonate by a method which may be briefly described as follows: A quantity of sodium postdodecylbenzene sulfonate was first agitated with a sufficient quantity of pentane to extract the oils present in the sulfonate salt. The pentane layer was decanted into a glass column filled with silica gel. The silica gel became saturated with the residual sulfonate, and the pentane passed through the column. The residual sulfonate was then extracted first with alcohol and then with water. After recovering the extract from the alcohol and water, the residual liquids were combined. The product so obtained was the desired sulfonate extract.

Before proceeding further, it is believed convenient at this time to define the materials used in preparing the extract of our invention.

The material which is subjected to extraction is an alkali metal alkaryl sulfonate having a combining weight, as the sodium salt, of 400 or greater. While alkali metal sulfonates, as previously defined, are suitable, sodium sulfonates are preferred for reasons of economics and availability. The alkaryl hydrocarbon from which the sulfonate is prepared can be either a synthetic or naturally-occurring material. Both of these terms are well understood in the art at this time. Examples of synthetic alkaryl hydrocarbons include the various fractions derived from the alkylation of dodecene with benzene, and in addition include diwaxbenzene, and dinonylnaphthalene. An example of a naturally-occurring alkaryl hydrocarbon is the material, which on sulfonation produces a mahogany sulfonate. (The terms mahogany sulfonate and petroleum sulfonate are synonymous with regard to the present invention.)

The alkali metal alkaryl sulfonates which are suitable have a combining weight, as the sodium salt, of 400 or greater. Preferably, this combining weight is in the range of 400 to 700. More preferably, the combining weight is in the range of 400 to 500. It is well known that alkaryl sulfonates of the type described are complex mixtures.

The alkali metal alkaryl sulfonates are usually not available as the pure material per se, but in the form of an oil solution. Because of this, preferably, prior to extraction the alkali metal alkaryl sulfonate is subjected to a deoiling step. In conducting this step, any of the materials which are normally used for deoiling can be used. Examples of suitable deoiling agents include pentanes, hexanes, heptanes, and petroleum naphthas. Pentane is a particularly suitable deoiling agent.

With regard to the alcohol which is used in the extraction, $C_1$ to $C_3$ alcohols are particularly suitable since they are economical and readily available. However, other alcohols which are liquid at the extraction conditions may be used, if desired. While the preferred manner of making the extraction is to adsorb the sulfonate on a silica gel column and then to pass alcohol and water through the column, it is possible to use other methods to carry out this extraction step such as stirring the material in aqueous alcohol and letting any undissolved material settle, liquid-liquid contacting columns and the like.

Preferred sulfonates for subjecting to extraction are sodium postdodecylbenzene sulfonate and a sodium petroleum sulfonate sold under the trade name Sherosope 430. Of these, sodium postdodecylbenzene sulfonate is particularly preferred.

Sodium postdodecylbenzene sulfonate is prepared by sulfonating the hydrocarbon postdodecylbenzene, thus producing postdodecylbenzene sulfonic acid. Neutralizing the sulfonic acid so obtained with sodium hydroxide gives sodium postdodecylbenzene sulfonate. Postdodecylbenzene is a mixture of monoalkylbenzene and dialkylbenzenes in the approximate ratio of 2 to 3. Its typical physical properties are as follows:

| | |
|---|---:|
| Specific gravity at 38° C. | 0.8649 |
| Average molecular weight | 385 |
| Percent sulfonatable | 88 |
| ASTM, D–158 Engler: | |
|   IBP _____ ° F__ | 647 |
|   5 _____ ° F__ | 682 |
|   50 _____ ° F__ | 715 |
|   90 _____ ° F__ | 760 |
|   95 _____ ° F__ | 775 |
|   FBP _____ ° F__ | 779 |
| Refractive index at 23° C. | 1.4900 |
| Viscosity at: | |
|   −10° C. _____ centipoises__ | 2800 |
|   20° C. _____ do____ | 280 |
|   40° C. _____ do____ | 78 |
|   80° C. _____ do____ | 18 |
| Aniline point, ° C. | 69 |
| Pour point, ° F. | −25 |

The particular sodium postdodecylbenzene sulfonate (extract) prepared as described above had a combining weight of 461 as the sodium salt, specific gravity of .943, and refractive index of 1.3537 at 25° C.

*Example I*

For comparison purposes, a sodium sulfonate prepared from a petroleum sulfonic acid and extracted with pentane, alcohol, and water was also obtained. The sodium petroleum sulfonate used was the product sold under the trade name Sherosope 430. The extract derived from this petroleum sulfonate had a combining weight of 435 as the sodium salt, specific gravity of .941, and refractive index of 1.3658 at 25° C.

This particular sulfonate fraction is very effective in increasing the viscosity of water when added thereto in relatively small amounts. This is rather unique, as most organic sulfonates will decrease the viscosity of water when added thereto. In Table I below are summarized the viscosities of aqueous solutions containing 0.2 and 1 percent of an extract, derived from sodium postdodecylbenzene sulfonate in water, 1 percent of an extract, derived from a sodium petroleum sulfonate (Sherosope 430), and 0.2 percent solutions of 3 other sulfonates (naphthalene 1,5-disodium sulfonate, sodium normal butyl sulfonate, and 2,4-dimethyl benzene sulfonate) and the viscosity of water at various temperatures:

TABLE 1.—VISCOSITY IN CENTIPOISES

| Temp. ° F. | Water | NaPDBSO$_3$, 0.2% Solution (Extract) | NaPDBSO$^3$, 1.0% Solution (Extract) | Sherosope 430 (1.0% Solution) (Extract) | Naphthalene 1,5 Disodium, SO$_3$ 0.2% Solution | Sodium Normal Butyl, SO$_3$ 0.2% Solution | 2,4 Dimethyl Benzene, SO$_3$ 0.2% Solution |
|---|---|---|---|---|---|---|---|
| 75 | 0.95 | 1.25 | 17.95 | 3.36 | 0.95 | 0.94 | 0.95 |
| 100 | 0.72 | 0.90 | 14.5 | 2.09 | 0.70 | 0.70 | 0.70 |
| 125 | 0.58 | 0.70 | 12.0 | 1.35 | 0.54 | 0.54 | 0.54 |
| 150 | 0.48 | 0.57 | 9.8 | 1.04 | 0.44 | 0.44 | 0.44 |
| 175 | 0.42 | 0.47 | 7.8 | 0.80 | 0.37 | 0.37 | 0.37 |
| 200 | 0.38 | 0.40 | 5.9 | 0.59 | 0.32 | 0.32 | 0.32 |

It will be noted that the viscosities presented for water differ slightly from those given in standard references. This is inherent due to differences in analytical procedure and technique.

Inspection of the preceding table shows that the addition of small amounts of the extract of this invention to water produces a composition having a viscosity substantially greater than that of water. Compositions containing 1 percent of the extract have a viscosity in the range of about 1.5 to about 20 times that of water alone.

In order to disclose more clearly the nature of the present invention and the advantages thereof, reference will hereinafter be made to certain specific embodiments which illustrate the flexibility of the herein-described process. It should be clearly understood, however, that this is done solely by way of example, and is not to be construed as a limitation upon the spirit and scope of the appended claims.

In the examples, a simple centrifugal method, as described by Dunning, H. N., et al., entitled "Displacement of Petroleum From Sand by Detergent Solutions," Bureau of Mines report of investigations 5020, December 1953, was used to determine the displacement efficiency of an aqueous solution containing the special fraction of postdodecylbenzene sulfonate as compared with water. The sand, Ottawa sand, initially was cleaned with hot chromic acid; washed thoroughly with tap water, distilled water, and acetone; and dried at 110° F. until it would flow freely. The crude oil was topped under vacuum to remove the more volatile ingredients. This treatment minimized erratic results caused by evaporation during the determinations and caused only minor changes in the specific gravity and viscosity of the crude oil. The particular crude oil used in these tests was obtained from the Grubb Lease in California. Properties of this crude oil were as follows:

Specific gravity at 60/60° F. _____ 0.828
Viscosity at 25° C. _____cp____ 2.68

In running the tests, the sand was mixed with sufficient oil to wet the sand surface, but insufficient to cause gravity drainage of the oil. Solutions of distilled water and the extract derived from sodium postdodecylbenzene sulfonate were prepared in concentrations of 0.1 percent, 0.2 percent, and 1.0 percent by weight of the extract in water. These solutions were prepared by adding 1.0, 2.0 and 10 grams of the extract to a 1000-ml. volumetric flask and adding water to volume. Solutions of the other materials in water were prepared in a similar manner. As to the amount of the metal sulfonate extracts used, that may be varied a great deal. In general, however, amounts less than about 0.1 weight percent of the extract in water should not be used, because concentrations less than that amount are not sufficient to do much good. On the other hand, a concentration of greater than 3.0 weight percent of the extract in water should not be used, because of economical reasons. Preferred quantities of the extract in water vary from about 0.1 to 1.0 weight percent.

*Example II*

Twenty-five grams of the synthetic oil sand were placed in a graduated olefin hydrocarbon test bottle. The bottle was then filled to the reference mark with 40 ml. of the 1500 parts per million detergent solution. The tests were run in batches of six samples, in which one of the tubes contained distilled water as a standard. Each tube, initially, was centrifuged for 15 minutes, removed from the centrifuge, tilted to about 45°, swirled gently to allow release of oil, and centrifuged for another ten minutes. This treatment was repeated four times; and after each centrifuging, the amount of oil displaced from the water was measured directly in the calibrated neck. Although the oil volume readings had not reached a constant value, the oil volume after the fifth centrifuging was taken as the amount of oil displaced from the sand. As a constant oil value was not reached, and it was impossible to give each sample exactly the same amount of agitation, each test was repeated three times; and an average of the results was taken. The results are represented as displacement efficiencies. The term "displacement efficiency" is defined as the amount of oil displaced from the synthetic oil sands by a solution relative to the amount displaced from the corresponding sand samples by distilled water. Results obtained in this test are subject to random errors in sample of the oil sand.

The experiment, together with the results, is summarized in Table 2 below:

TABLE 2

| Flooding Composition | Viscosity of Soln. Cps. | Displacement Efficiency |
|---|---|---|
| Water+0.1% NaPDBSO$^3$ (extract) | 5.4 | 1.26 |
| Water+0.2% NaPDBSO$^3$ (extract) | 10.1 | 1.68 |
| Water+1.0% NaPDBSO$^3$ (extract) | 17.95 | 1.86 |
| Water+1.0% Sherosope 430 (extract) | 3.76 | 1.08 |

Water solutions containing 0.2 weight percent of naphthalene 1,5 disodium sulfonate 0.2 percent solution, sodium normal butyl sulfonate 0.2 percent solution, and 2,4 dimethyl benzene sulfonate 0.2 percent solution were prepared; and the displacement efficiencies of these solutions were determined at 75° F. and at higher temperatures. At 75° F., these solutions gave a displacement efficiency of 1. At temperatures above 75° F. the displacement efficiencies of the solutions were less than 1.

Example III

In still another embodiment, sodium postdodecylbenzene sulfonate was extracted with a 50:50 volume solution of isopropanol in water and the extract recovered from the aqueous solution by evaporation. Sufficient extract was added to water to prepare a 2 weight percent solution, and the viscosity was measured at various temperatures. The results are shown in FIGURE 1 and are plotted as ⊗ on the graph. Several months subsequent to this time, the run was repeated and the data are plotted as ⊙ on the graph. For comparison purposes, the handbook viscosities for water at the various temperatures are plotted as ○ on this graph.

Example IV

Another run was made where the heavy bottoms from benzene alkylation was sulfonated with 20% oleum using 1.7/1 weight ratio to alkylate. A water addition was made after sulfonation and spent acid removed.

The sulfonic acid was neutralized with 8% NaOH in a 50/50 water/isopropyl alcohol solution. The resulting sulfonate was diluted to a concentration of about 10% with 50/50 alcohol/water solution and two hexane extractions were made to remove free oil. Water was split off by saturating the solution with $Na_2CO_3$ and the alcohol was stripped off by vacuum distillation. The final product was 70% solids, as determined by our moisture balance, and had no isopropanol odor.

Several concentrations of the sulfonate in distilled water were made for viscosity measurements. The viscosities were determined with a Fann Model 35 V-G Meter. Viscosities are reported as plastic viscosities ($\mu p.$):

$$\mu p. = N \times (600 \text{ r.p.m. reading} - 300 \text{ r.p.m. reading})$$

where $N$ = range extension factor of the torque spring

The following table lists the results obtained for the sulfonate:

| Sulfonate Conc. (Percent) | Scale Deflection | | $\mu p.$* (cp.) |
|---|---|---|---|
| | 600 r.p.m. | 300 r.p.m. | |
| 0.5 | 4.5 | 2.5 | 1.0 |
| 1.0 | 6.0 | 3.5 | 1.25 |
| 2.0 | 8.0 | 4.5 | 1.75 |
| 5.0 | 13.0 | 7.0 | 3.0 |
| | 31.5 | 18.0 | 6.75 |

* $N = 0.5$.

It can be seen from the above table that the aqueous alcohol soluble portion of the sodium alkaryl sulfonate as obtained above was effective as a viscosity improver for water.

While particular embodiments of the invention have been described, it will be understood, of course, that the invention is not limited thereto, since many modifications may be made; and it is therefore contemplated to cover by the appended claims any such modifications as fall within the true spirit and scope of the invention.

The invention having thus been described, what is claimed and desired to be secured by Letters Patent is:

1. A water composition having a viscosity substantially greater than that of water, said composition comprising a major amount of water and 0.1 to 5.0 weight percent of an extract which is derived by an aqueous solution of a $C_1$ to $C_3$ alcohol extraction of an alkali metal alkaryl sulfonate wherein said alkaryl sulfonate portion is selected from the group consisting of postdodecylbenzene sulfonate and petroleum mahogany sulfonates, said sulfonate having a combining weight as the sodium salt of at least 400.

2. A water composition as defined in claim 1 wherein the extract of the alkali metal alkaryl sulfonate is present in the range of 0.1 to 3.0 percent by weight.

3. A water composition as defined in claim 2 wherein the alkali metal alkaryl sulfonate has a combining weight as the sodium salt in the range 400 to 700.

4. A water composition as defined in claim 3 wherein the alkali metal alkaryl sulfonate is the sodium salt and has a combining weight as the sodium salt in the range 400 to 500.

5. A water composition as defined in claim 4 wherein the alkali metal alkaryl sulfonate is deoiled prior to extracting with alcohol and water.

6. A water composition as defined in claim 5 wherein the alkali metal alkaryl sulfonate is sodium postdodecylbenzene sulfonate.

7. A water composition as defined in claim 5 wherein the alkali alkaryl sulfonate is a sodium petroleum mahogany sulfonate.

8. The composition of claim 3 wherein the alkali metal alkaryl sulfonate is pentane deoiled prior to extracting with alcohol and water.

9. The composition of claim 8 wherein the alkali metal alkaryl sulfonate is sodium postdodecylbenzene sulfonate.

10. The composition of claim 8 wherein the alkali metal alkaryl sulfonate is a sodium petroleum mahogany sulfonate.

References Cited

UNITED STATES PATENTS

| | | | |
|---|---|---|---|
| 2,808,109 | 10/1957 | Kirk | 252—8.55 X |
| 2,839,466 | 6/1958 | Shock | 252—8.55 X |
| 2,842,588 | 7/1958 | Honeycutt | 260—504 |
| 2,924,618 | 2/1960 | Anerson et al. | 260—505 |

LEON D. ROSDOL, *Primary Examiner.*

HERBERT B. GUYNN, *Examiner.*